(12) United States Patent
Richter

(10) Patent No.: US 7,360,966 B2
(45) Date of Patent: Apr. 22, 2008

(54) METHODS AND SYSTEMS FOR REMEDIATING CONTAMINATED SOIL

(75) Inventor: Roger T. Richter, Portland, OR (US)

(73) Assignee: Mobile Environmental Technologies, Inc., Portland, OR (US)

( * ) Notice: Subject to any disclaimer, the term of this patent is extended or adjusted under 35 U.S.C. 154(b) by 0 days.

(21) Appl. No.: 10/535,612

(22) PCT Filed: Dec. 5, 2003

(86) PCT No.: PCT/US03/38839

§ 371 (c)(1),
(2), (4) Date: Jan. 13, 2006

(87) PCT Pub. No.: WO2004/052566

PCT Pub. Date: Jun. 24, 2004

(65) Prior Publication Data

US 2006/0171780 A1    Aug. 3, 2006

Related U.S. Application Data

(60) Provisional application No. 60/431,388, filed on Dec. 5, 2002.

(51) Int. Cl.
*B09C 1/06* (2006.01)
(52) U.S. Cl. .................. 405/128.6; 405/128.85
(58) Field of Classification Search ............. 405/128.4, 405/128.1, 128.15, 128.2, 128.7, 128.8, 128.85
See application file for complete search history.

(56) References Cited

U.S. PATENT DOCUMENTS

| 4,919,570 | A | * | 4/1990 | Payne | 405/128.7 |
| 5,228,804 | A | * | 7/1993 | Balch | 405/128.85 |
| 5,318,116 | A | * | 6/1994 | Vinegar et al. | 405/128.4 |
| 6,000,882 | A | * | 12/1999 | Bova et al. | 405/128.85 |
| 6,596,142 | B2 | * | 7/2003 | McGee | 405/128.85 |

FOREIGN PATENT DOCUMENTS

WO    WO02/094464 A2 * 11/2002

* cited by examiner

*Primary Examiner*—John Kreck
(74) *Attorney, Agent, or Firm*—Hani Z. Sayed; Rutan & Tucker, LLP

(57) ABSTRACT

A system and method for remediation of contaminated soil are provided. The system comprises a soil remediation cell of contaminated soil and a plurality of multi-functional conduits located within the contaminated soil. Each multi-functional conduit defines a reaction housing. The multi-functional conduits includes heating elements for introducing heat into the contaminated soil for volatilizing the contaminants located within the contaminated soil, without utilizing mechanically driven forced air. This 10 produces a contaminated vapor. Flow channels extending therethrough remove the contaminated vapor from within the soil remediation cell. A substantial portion of the contaminants in the contaminated vapor are destroyed in the reaction housing. A substantially non-contaminated vapor is produced in which at least about 80% by weight of the contaminants have been destroyed.

40 Claims, 5 Drawing Sheets

METHODS AND SYSTEMS FOR REMEDIATING CONTAMINATED SOIL

This application is a national stage entry under 35 USC 371 of PCT/US03/038839 filed Dec. 5, 2003 claiming priority back to U.S. Provisional application No. 60/431,388 filed on Dec. 5, 2002.

BACKGROUND OF THE INVENTION

The invention relates to methods and systems for remediating contaminated soil, and more particularly to a methods and systems for volatilizing contaminants in the soil and effectively and efficiently destroying the same therefrom.

Systems for conducting fluid through a soil stack are known. U.S. Pat. No. 4,139,321 describes a rock channel heat storage method involving conduit connections provided within a rock-filled channel. The conduits are used to conduct fluid through the rock pile to either absorb or disperse thermal energy. Soviet Patent 837,997 describes a method for the thermal treatment of embankment soil. A main hold 3 receives heated combusted gas and directs same into spiral holes 5 which are vented through valves 8. U.S. Pat. No. 4,036,285 describes an arrangement to control heat flow between a member and its environment including conduit members which conduct heat transfer fluid underground. Other patents which show devices for conducting fluid through a soil stack include U.S. Pat. Nos. 123,384; 2,332,227; 2,332,227; 3,105,134; 3,564,862; 3,935,900; 5,449,113; Soviet Union 600,262; Soviet Union 996,662; Fed. Rep. Germany 2,706,740.

Systems for removing contaminants from the ground are also known. For example, U.S. Pat. No. 4,982,788 removes contaminants from the ground by circulating air between two substantially parallel wells and by removing the vapors of the organic compounds from the circulated air using at least one of a condenser and a demister. U.S. Pat. No. 5,011,329 relates to in situ decontamination by injecting a hot gas into boreholes formed in a contaminated soil area. A method is also provided in U.S. Pat. No. 5,018,576 for in situ decontamination of contaminated subsurface areas by injection of steam into injection wells and withdrawing of liquids and vapors from the wells under sub-atmospheric pressure.

Systems have also been known for removing contaminants from soil piles or soil stacks. U.S. Pat. No. 4,973,811 relates generally to in situ decontamination of soil using radio frequency induction heating. In U.S. Pat. No. 5,035,537, soil, porous rock, and similar contaminated materials are gathered, dispersed uniformly on a horizontal surface, and treated with an emulsifying agent.

U.S. Pat. No. 5,067,852 relates to a method and apparatus for removing volatile contaminants from contaminated soil which has been stacked onto a first vapor-tight liner. A first set of air distribution pipes disposed within the soil stack each of which has an opened end, a closed end, and a plurality of perforations located in the body of the pipes. An air stream is introduced into the open end of the distribution pipes and exits the distribution pipes through the perforations and into the contaminated soil stack. The air flows from the distribution pipes, through the contaminated soil, and volatilizes contaminants within the contaminated soil. The airflow from the distribution pipes employs a gravel filter medium to prevent the perforations in the distribution pipes from clogging. The volatized vapor created as a result of the induced airflow is carried by the airflow through the soil, and is exhausted from the soil. The volatilized vapors exiting the soil stack are disposed of through an external vapor treatment system. A second vapor-tight liner is placed over the soil stack to creating an impervious enclosure between the respective first and second liners, which are typically formed of a polyethylene film. In order to avoid melting of the first and/or second liners, the temperature of the soil stack would have to be maintained below the melting temperature of the respective liners.

U.S. Pat. Nos. 5,213,445 and 5,340,236 are directed to a similar process to U.S. Pat. No. '852 except that they provide a recirculating system which destroys the contaminant phase and returns heated decontaminated air to the air distributions pipes. The air-heating unit, which is located outside of the soil stack, heats the air to temperature between 275 and 300 degrees F.

The above-described methods and systems, which are incorporated herein by reference, have a number of drawbacks. They are closed loop systems which recirculates a substantial portion of the heated air after the contaminants are burned or removed. Recirculation of air through heaters reduces oxygen in the air stream thereby reducing the effective level of volatilization. These systems of U.S. Pat. Nos. '852, '445 and '236 make use of a vacuum to encourage contaminants to achieve vapor phase which has proven to be an ineffective approach for affecting remediation. As previously stated, the temperature of the volatizing air must be maintained below the melting temperature of the sealing member in order maintain its structural integrity. The above prior art systems are designed to move the vaporized contaminants through the soil stack into the space there above surrounded by the flexible sealing member. Therefore, the soil cannot be packed down to maintain the structural integrity of the soil stack without adversely affecting the efficiency of the remediation process.

In U.S. Pat. No. 6,000,882, a system and method for remediation of contaminated soil removed from a soil site is provided. This U.S. Pat. No. 6,000,882 is incorporated herein by reference. The contaminated soil is placed upon several layers of perforated heating pipes forming a remediation cell, and the entire cell is covered by a galvanized Quonset Hut-shaped steel building to prevent the escape of vapors from the soil cell. Heating air introduced into perforated heating pipes heat conductively heats the contaminated soil creating a differential pressure area around the heated pipes. This results in the migration of volatilized contaminants and moisture through the perforations in the pipe walls and into the lower pressure area within the heated steel pipes, forcing the contaminants from the soil and into an off-gas treatment system. The forced air system described in U.S. Pat. No. 6,000,822 generates a substantial volume of heated air which is a burden on capacity and operability of the subject contaminant removal system.

U.S. Pat. No. 6,296,815 B1 relates to an apparatus is disclosed for thermal desorption of contaminants from contaminated material, the apparatus including: a plurality of first insulated boxes, each insulated box, defining a volume effective for holding contaminated material, and each insulated box defining an opening at the top of the insulated box; at least one top effective to fit on the opening at the top of the insulated box and each top defining a pattern of heater orifices; a plurality of heaters, the heaters being insertable into the volume for holding contaminated material, through the heater orifices defined by the top; and a vapor extraction system effective to-remove vapors from within the volume for holding contaminated material.

PCT/US02/16395 was converted into a national application in the US on Nov. 20, 2003. This US application which is incorporated herein by reference, is directed to a system and method for remediation of contaminated soil. The system comprises a soil remediation cell of contaminated soil, and a plurality of multi-functional perforated pipes located within the contaminated soil. The multi-functional perforated pipes operate as (a) heating elements for introducing heat into the contaminated soil for volatilizing the contaminants located within the contaminated soil without utilizing mechanically driven forced air thereby producing a contaminated vapor, and (b) flow channels for removing the contaminated vapor from within the soil remediation cell. A high temperature covering, located about the soil remediation cell, forms a chamber over the soil remediation cell which receives and collects in the chamber the contaminated vapor which have been released from the multi-functional perforated pipes. Means for collecting and/or destroying contaminants in the contaminated vapors collected in the storage chamber can also be employed in conjunction with the soil remediation cell.

SUMMARY OF THE INVENTION

The above-described drawbacks have been met by the system and methods of the present invention.

The subject invention is not a closed loop system as indicated in U.S. Pat. Nos. 5,213,445 and 5,067,832. The system and method of this invention also does not make use of a vacuum to encourage contaminants to achieve vapor phase. The system and method herein are designed to treat both volatile and semi-volatile contaminants as well as a wide variety of soil types (frozen, very wet, high clay content, etc.) And, unlike the prior art systems and methods, in the process and method of this invention, soil can be packed down without decreasing the efficiency of the system.

The system and methods of the present invention also meet the drawbacks of the use of forced heated air as the medium for transporting heat to the contaminated soil and transporting the contaminated vapor away from the contaminated soil as described in U.S. Pat. No. 6,000,822. The system and methods of the present invention do not employ forced, heated air.

More specifically, a system for remediation of contaminated soil is provided. The system comprises a soil remediation cell of contaminated soil and a plurality of multi-functional conduits located within said contaminated soil. Each said multi-functional conduit defines a reaction housing.

Preferably each said multi-functional conduit has a perforated portion comprising a plurality of perforations and a non-perforated portion, respectively. This non-perforated portion defines the reaction housing. The contaminated vapors flow preferably into and through the perforated portion and into the non-perforated portion. The perforated portion can be joined to the outer surface of the non-perforated portion.

Preferably, an opening is defined between the perforated portion and the non-perforated portion to facilitate the flow of the contaminated vapors from the perforated portion to the non-perforated portion. This opening is preferably located in the center portion of the multi-functional conduits. In a preferred form of this invention, the contaminated vapors moves into and through the perforated portion and into the non-perforated portion, due to a pressure differential created by the heat introduced into, and generated within, the contaminated soil. The perforated portion preferably comprises a perforated tube and the non-perforated portion comprises a non-perforated tube. The multi-functions conduits preferably comprise an expansion portion located adjacent to one end thereof.

The multi-functional conduits include heating elements for introducing heat into the contaminated soil for volatilizing the contaminants located within the contaminated soil, without utilizing mechanically driven forced air, thereby producing a contaminated vapor.

The heat is introduced through heating elements located within the multi-functional conduits into the contaminated soil through the walls of the conduits. Thus, the multi-functional conduits are preferably heated to a temperature which will raise the temperature of contaminated soil above 212 degrees F. as hereinafter described. Extremely high temperature can also be employed depending on the temperature limitations of the multi-functional conduits and any covering which may be employed. Thus, in cases where multi-functional conduits and the covering are used which can withstand extremely high temperatures, i.e., from 2,000 up to 3,000 degrees F., a corresponding extremely high temperature heat can be employed.

The multi-functional conduits operate in several ways. In one function of the conduits heat can be imparted to the contaminated soil, volatilizing the contaminants located within the contaminated soil, and thereby producing a pressurized, contaminated vapor. This will typically cause the contaminated soil to be heated to an average temperature of at least about 212 degree F., preferably to an average temperature of at least about 250 degree F., more preferably to an average temperature of at least about 500 degree F., and most preferably to an average temperature of at least about 1000 degree F.

A further function of the multi-functional conduits is providing a path for removing the contaminated vapor from within the multi-layer soil remediation unit through the multi-functional conduits. The remediation cell is typically multi-layered and formed of a plurality of adjacent layers of contaminated soil, and a plurality of multi-functional conduits are located between the adjacent layers of contaminated soil. The multi-functional conduits are preferably arranged in a substantially horizontal plane with respect to the horizontal axis of said remediation cell. A substantial amount of the contaminated vapors are typically destroyed within the low-pressure dehydrated soil prior to entering the multi-functional conduits.

More specifically, flow channels are provided which extend though the multi-functional conduits for removing the contaminated vapor from within the soil remediation cell. Preferably, this function is accomplished by conductively heating the contaminated soil with the high temperature heat, thereby volatilizing the contaminants located within the contaminated soil and producing a pressurized, contaminated vapor. Preferably, perforations provided in the multi-functional conduits act as flow channels allowing the contaminated vapors to migrate from the contaminated soil, through the perforations, and into and through the multi-functional conduits. The contaminated vapors typically move from the contaminated soil, where the vapors are under high pressure, through the perforations in, for example, multi-functional manifolds, and into the multi-functional conduits which are maintained at low pressure. The movement of the contaminated vapors is therefore preferably due to the pressure differential between the high-pressure soil and the low-pressure conduits. By removing the contaminated vapor from within the soil remediation cell through the multi-functional conduits, the contaminants are expurgated from the contaminated soil Another function of the multi-functional conduits is providing for the destruction of the contaminated vapors as they are moved by vapor pressure from the soil into the multi-functional conduits. Inside the multi-functional conduits, the contaminated vapors must pass within a reaction housing wherein a substantial portion of the contaminants in the contaminated vapor in the contaminated vapor are destroyed so as to produce a substantially non-contaminated vapor. Preferably, the contaminated vapor is destroyed within the confines of the remediation cell.

The system of the present invention can destroy at least about 80% by weight of the contaminants in the contaminated vapor. Preferably at least about 85% by weight, more preferably at least about 90% by weight, and most preferably at least about 95% by weight, of the contaminants in the contaminated vapor are destroyed by the use of the subject system.

Due to a pressure differential created by the high temperature vapors within the contaminated soil, the system of this invention preferably does not require any moving parts to move air because the vapors are not in the air moving through the soil which volatilized the contaminants. Instead, the vapors are formed by the conductive heating of the soil. Vapors do not move through the soil to the top of the soil cell but rather into the conduits and along the heating elements and into the exhaust chamber. The amount of contaminated vapor that flows from the multi-functional perforated conduits into the reaction housing is preferably controlled by the amount of heat introduced into the contaminated soil.

The system of present invention is typically designed so that the treated vapors pass through the multi-layer soil remediation system without re-circulating the vapors to the system. In other words, the subject system is preferably configured for a single-pass remediation operation.

By employing the subject system, the non-contaminated vapor can be introduced directly into the atmosphere surrounding the soil remediation cell. Preferably, the system of this invention does not include any additional recovery equipment to destroy the contaminants and/or does not require incineration of the contaminants in the substantially non-contaminated vapor.

Preferably, the non-contaminate vapor does not include more than about 0.01% of nitrogen oxides. More preferably, the non-contaminate vapor does not include substantially any nitrogen oxides.

When the vapors are removed from within the multi-layer soil remediation unit, the moisture level is substantially reduced in the contaminated soil, preferably to an average moisture level of less than about 5% by weight, more preferably to an average moisture level of less than about 2% by weight, and most preferably to an average moisture level of less than about 1% by weight.

The heat for destroying the contaminants in the contaminated soil is typically produced by an electrical current. Typically, this heat is infrared heat.

The contaminated vapors are preferably not recirculated to the soil remediation cell. Moreover, the system has a sound level and a dust level in the area of the remediation cell which are substantially reduced due the absence of substantial equipment in the system having moving mechanical parts. The system of the present invention also preferably maintains a substantial constant level of soil remediation due to either a substantially fixed heat introduction rate or a substantially fixed heat temperature.

The system of this invention further includes a high temperature covering. The remediation cell soil and said plurality of multi-functional conduits are also preferably located within a structural enclosure. The structural enclosure preferably defines an open bottom to facilitate removal of the non-contaminated soil. The structural enclosure also preferably includes support members for maintaining the integrity of the structural enclosure during soil removal. The structural enclosure can comprise a trailer or a container. The container preferably has an open bottom for facilitating the expulsion of the non-contaminated soil there from. Preferably, the multi-functional conduits are connected to the structural enclosure. Typically, a vapor space is provided above the soil remediation cell. The vapor space can comprise a steam vapor space which, during remediation of the contaminated soil, provides a path for the vapors in this space to migrate into the multi-function conduits. The preferred structural enclosure is insulated, and is stackable onto another structural enclosure.

A method for remediating contaminated soil is also provided. The method comprises forming a soil remediation cell of contaminated soil, and a plurality of multi-functional conduits located within said contaminated soil. Each multi-functional conduit defines a reaction housing. Substantial heat from the multi-functional conduits is introduced into the contaminated soil, volatilizing the contaminants located within the contaminated soil. This is accomplished without utilizing mechanically driven forced air. A contaminated vapor is produced. Next, the contaminated vapor is removed from within the contaminated soil through flow channels within said multi-functional conduits. Then, the contaminated vapor is introduced into said reaction housing. Finally, a substantial portion of the contaminants in said contaminated vapor are destroyed within the reaction housing so as to produce a substantially non-contaminated vapor in which at least about 80% by weight of the contaminants have been destroyed. As described above, each said multi-functional conduit has a perforated portion comprising a plurality of perforations forming flow channels for removing the contaminated vapor, and a non-perforated portion which defines the reaction housing.

DESCRIPTION OF THE DRAWINGS

FIG. 4 is a schematic end of system 1a.

DETAILED DESCRIPTION OF A PREFERRED EMBODIMENT

Referring to FIGS. 1-4, systems 1 and 1a are provided for remediation of contaminated soil which is removed from or stored at a contaminated soil remediation site.

Figure 1:
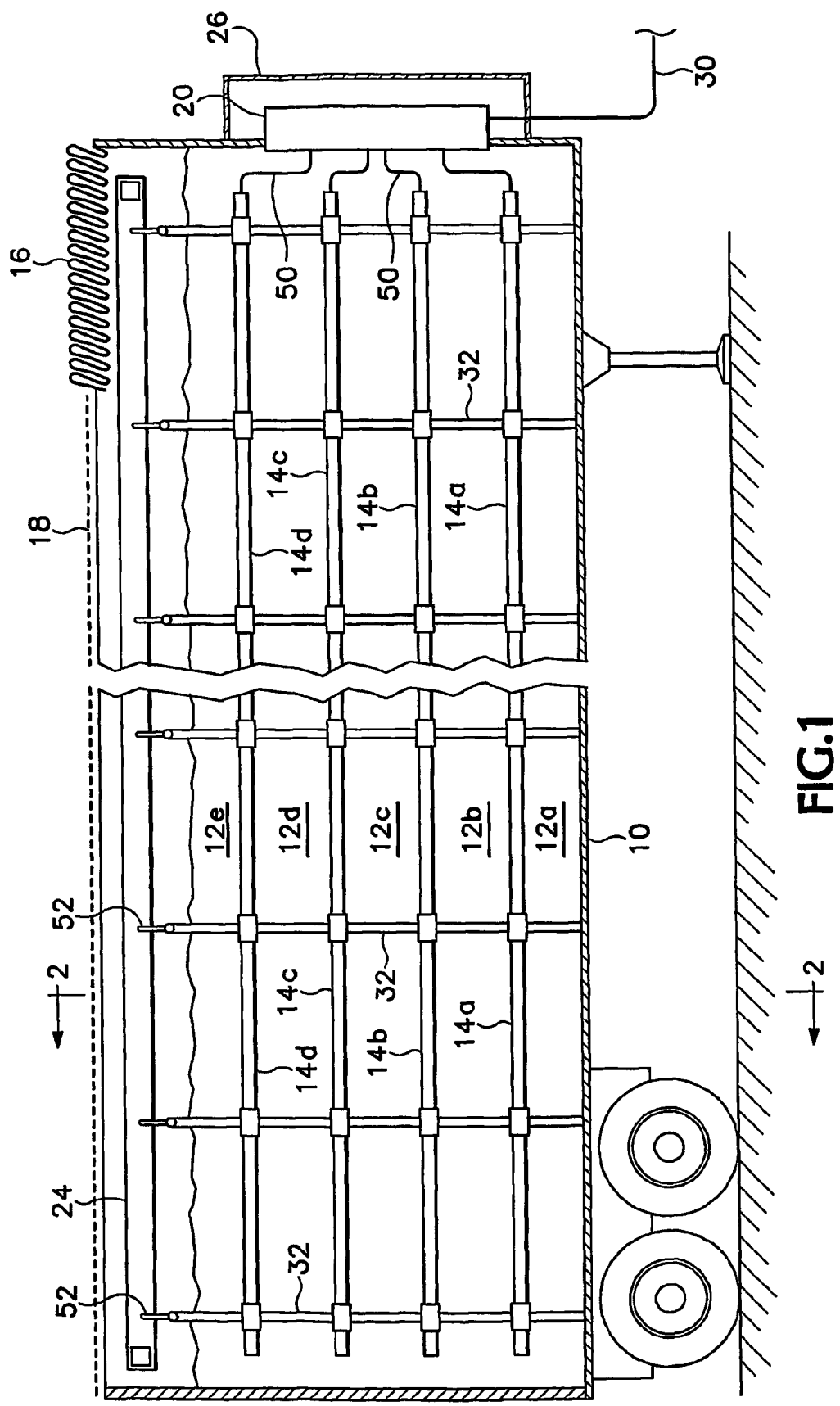
FIG. 1 is a schematic, side view of a preferred system 1 of the present invention.
Figure 2:
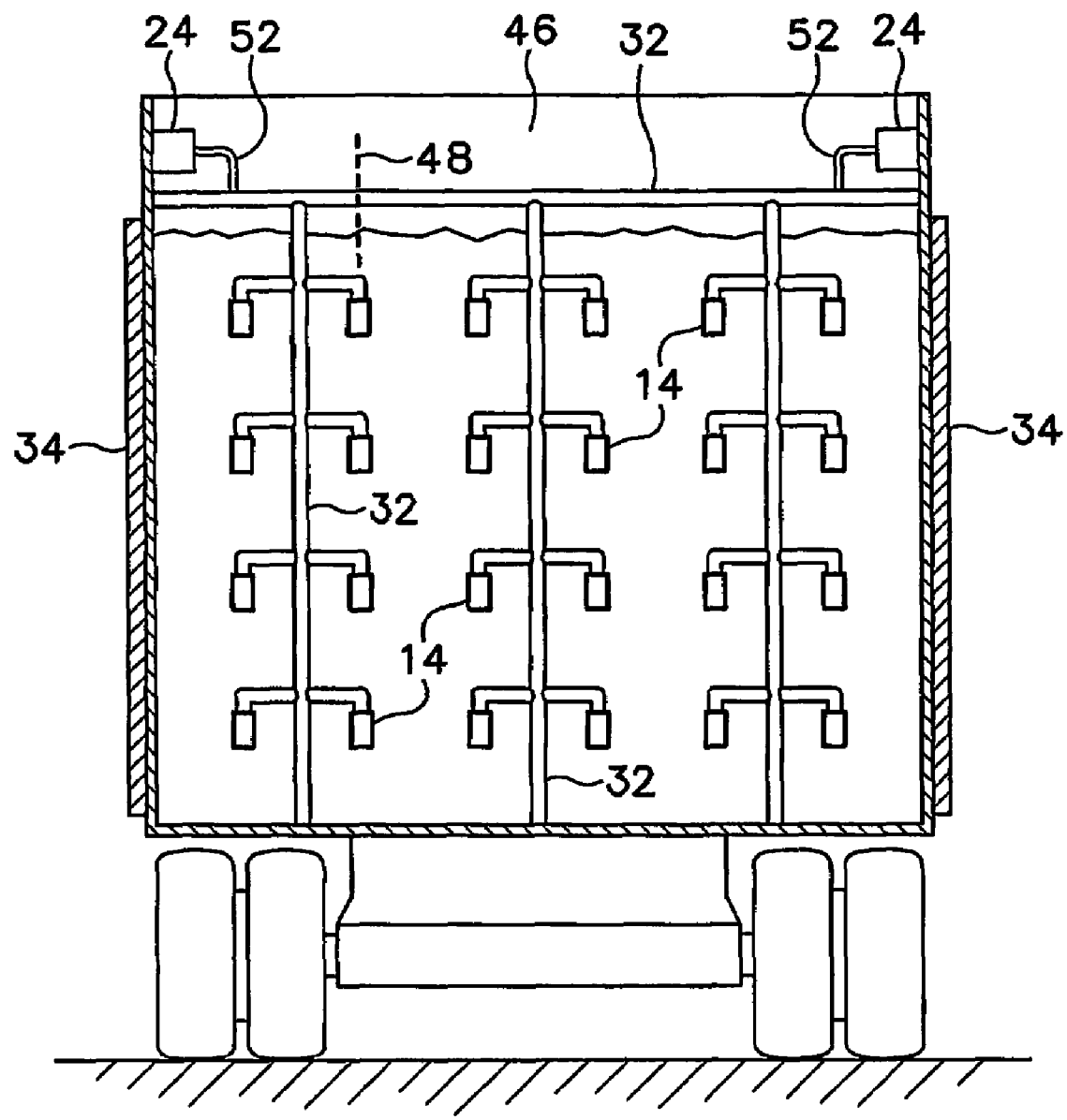
FIG. 2 is a schematic, end of the system 1 of FIG. 1 taken along line 2-2.

Referring to FIGS. 1 and 2, the system 1 of the present invention can comprise a multi-layer contaminated soil remediation cell formed of a plurality of adjacent layers of contaminated soil 12a-12e, having a plurality of multi-functional conduits 14a-14d located between the adjacent layers of contaminated soil, all housed within a structural enclosure 10, which in this case comprises a transportable trailer. The multi-functional conduits 14a-14d are supported by conduit supports 32. The conduit supports 32 also function as a vapor path from the multi-functional conduits 14a-14d to the exhaust manifold 24.

In order to prepare for use of one of these remediation cells, a 20 ft×40 ft work area is cleared and leveled. This work area can comprise concrete, soil, asphalt or any other surface that can support the weight of the system 1 including the contaminated soil that will be treated.

The system 1 is set in place and cover 16 is removed. The cover 16 is built for high temperature conditions and is typically manufactured from kevlar or steel. Once the cover 16 is removed, contaminated soil is introduced into the enclosure 10 leaving a space between the top surface of the contaminated soil and top surface of the enclosure 10. Typically, this can be within six inches of the top of the enclosure 10. This allows for a vapor space 46 (see FIG. 4) above the contaminated soil. A vapor path 48 is provided for the vapor space 46 which is in communication with the multi-functional conduits 14a-14d. Once the enclosure 10 is filled with contaminated soil, the cover 16 is put in place and sealed. A high temperature gasket material 18 on the perimeter of the cover 16 forms a vapor barrier for limiting the escape of vapors produced during the volatilization of the contaminants in the contaminated soil. An electrical supply 30 is provided to the power control panel 20 located at one end of the contaminated soil remediation unit. As shown in FIG. 5, heating elements 22 are connected to the power control panel 20 at one end of the contaminated soil remediation unit. These connections 50 are designed to withstand the effects of high temperature operation and soil flow. The power control panel 20 is energized and the heating elements 22 begin to introduce infrared heat into the contaminated soil.

As the contaminated soil 12a-12e is heated, the applied heat creates a temperature gradient extending outward from the multi-functional conduits 14a-14d, with the contaminated soil closest to the multi-functional conduits 14a-14d having the highest temperature. As the contaminated soil temperature reaches 212 degrees F., the moisture and the contaminants in the contaminated soil immediately adjacent to the multi-functional conduits 14a-14d are converted from a liquid to a gas phase. This vapor is at high pressure and flows into the multi-functional conduits 14a-14d which is the low pressure point within the contaminated soil. As a result, the contaminated soil immediately adjacent to the multi-functional conduits 14a-14d is undergoes dehydration. The dehydrated soil substantially surrounds the multi-functional conduits 14a-14d. As heat continues to be applied to the contaminated soil, the contaminated soil surrounding the multi-functional conduits 14a-14d reaches 212 degrees F., and the water and contaminants in the soils volatilize creating zones of high pressure vapors. The difference in pressure between the respective high and low pressure areas forces contaminated vapor, depicted as arrows, to move through the dehydrated soil and into the multi-functional conduits 14a-14d.

Referring to FIG. 5, the contaminated vapors enter the perforated portion 36 of the multi-functional conduits 14. The perforated portion 36 is joined to the outer surface of the non-perforated portion 38. An opening 40 is located between the perforated portion 36 and the non-perforated portion 38 to facilitate the flow of contaminated vapors from the perforated portion 36 to the non-perforated portion 38. An expansion area 42 is provided for the multi-functional conduits 14 as they enlarge when heated during the remediation process.

The dehydrated soil acts as a pathway for the high-pressure vapor. Moist soil surrounding the multi-functional conduits 14a-14d, dehydrated soil and soil containing the high-pressure vapor acts as a vapor barrier. Also, a substantial amount of the contaminants are destroyed within the low-pressure dehydrated soil prior to entering the multi-functional conduits 14a-14d.

Once inside the multi-functional conduits 14a-14d, a substantial amount of the contaminants present in the contaminated vapor are destroyed by the heat generated by high temperature heating elements 22. The remaining decontaminated vapor then flows through the conduit supports 32 (see FIGS. 1-4) and into the exhaust chamber 24 where it is exhausted into the atmosphere. Flexible steel hose 52 connects the conduit supports 32 to the exhaust chamber 24.

It is understood that the quantity, size and relative configuration, etc., of multi-functional conduits 14a-14d and contaminated soil layers 12a-12e can vary depending on circumstances involved in a given remediation situation.

Infrared heating elements 22 located inside the multi-functional conduits 14a-14d supply infrared heat for volatilizing the contaminants and water present in the contaminated soil. Heating elements 22 which, for example, can be employed in the systems 1 and 1a generate approximately 6000 watts of power.

The multi-functional conduits 14a-14d are typically manufactured from stainless steel (approximately ¼" wall thickness) so as to prevent damage from heavy equipment and/or falling debris (during loading).

All sides of the enclosure 10 have insulation 34 disposed thereon to minimize heat loss from the remediation operation. This insulation is typically ceramic insulation protected by a Teflon cover.

Typically, this system is designed to allow treatment of contaminated soil in 1 to 75 ton batches. The equipment can be modified to treat larger volumes if needed.

Once treatment is complete (typically 24 to 48 hrs), the electrical power is turned off and the soil is dumped from the unit by operation of a hydraulic hoist 26.

Figure 3:
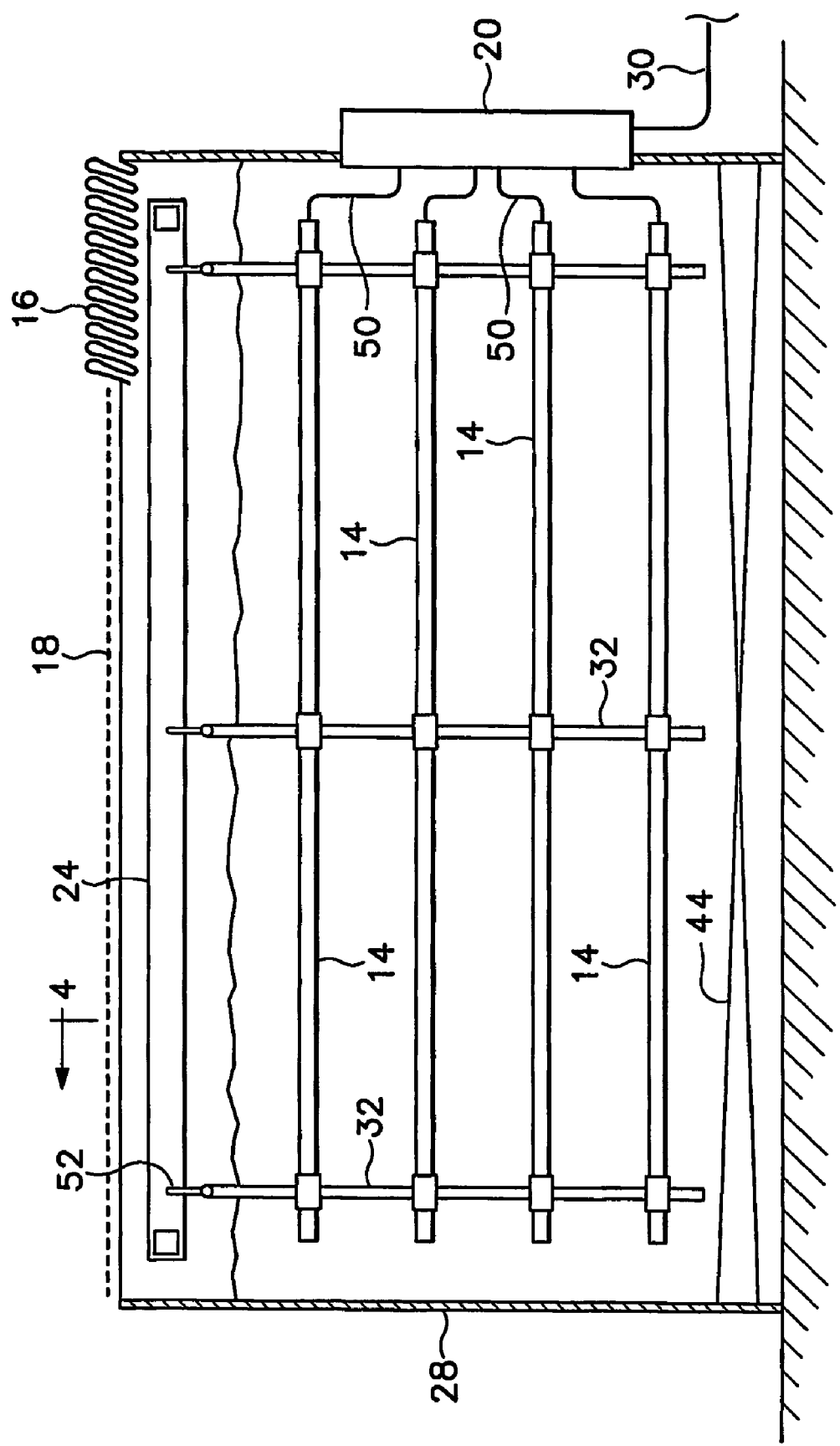
FIG. 3 is a schematic, side view of a preferred system 1a of the present invention.
Figure 4:
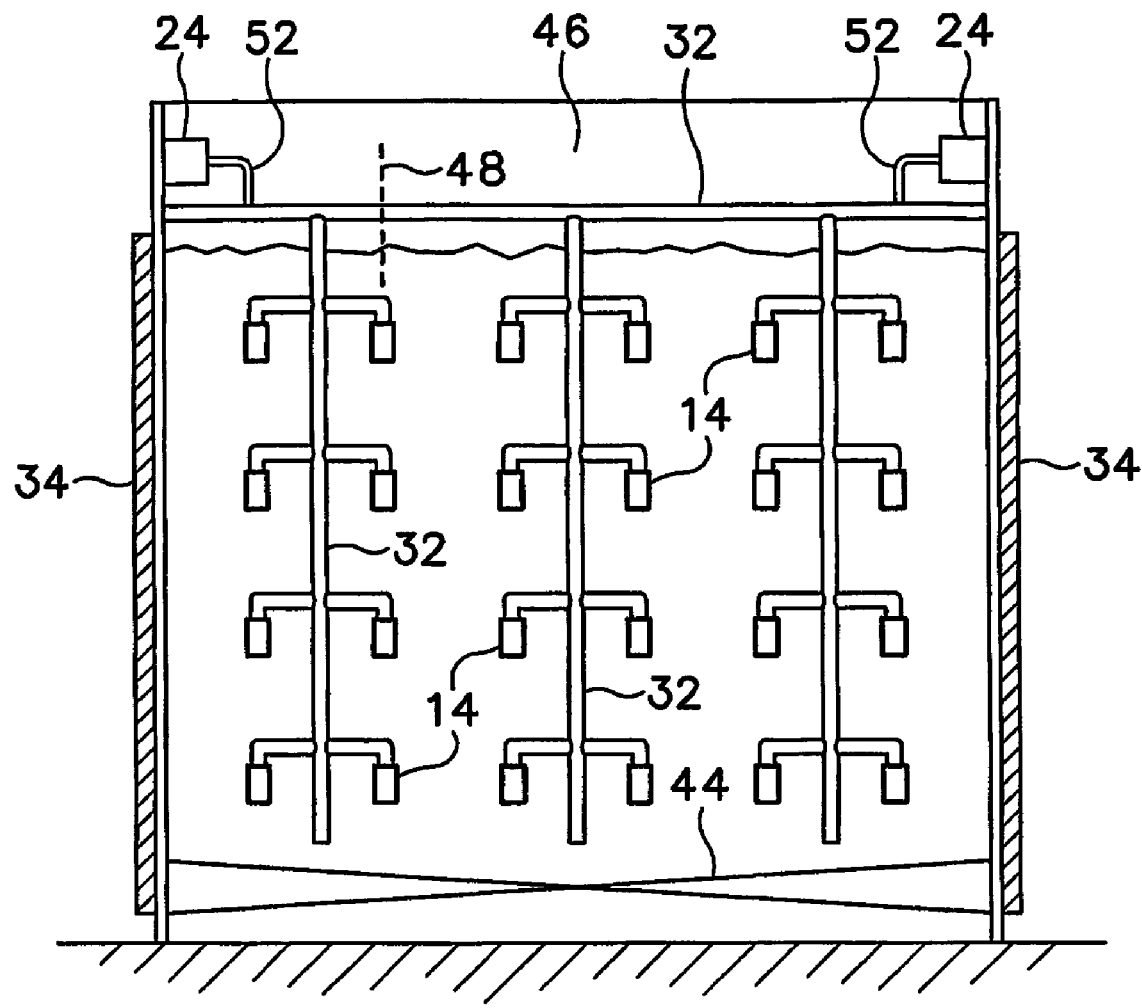
Figure 5:
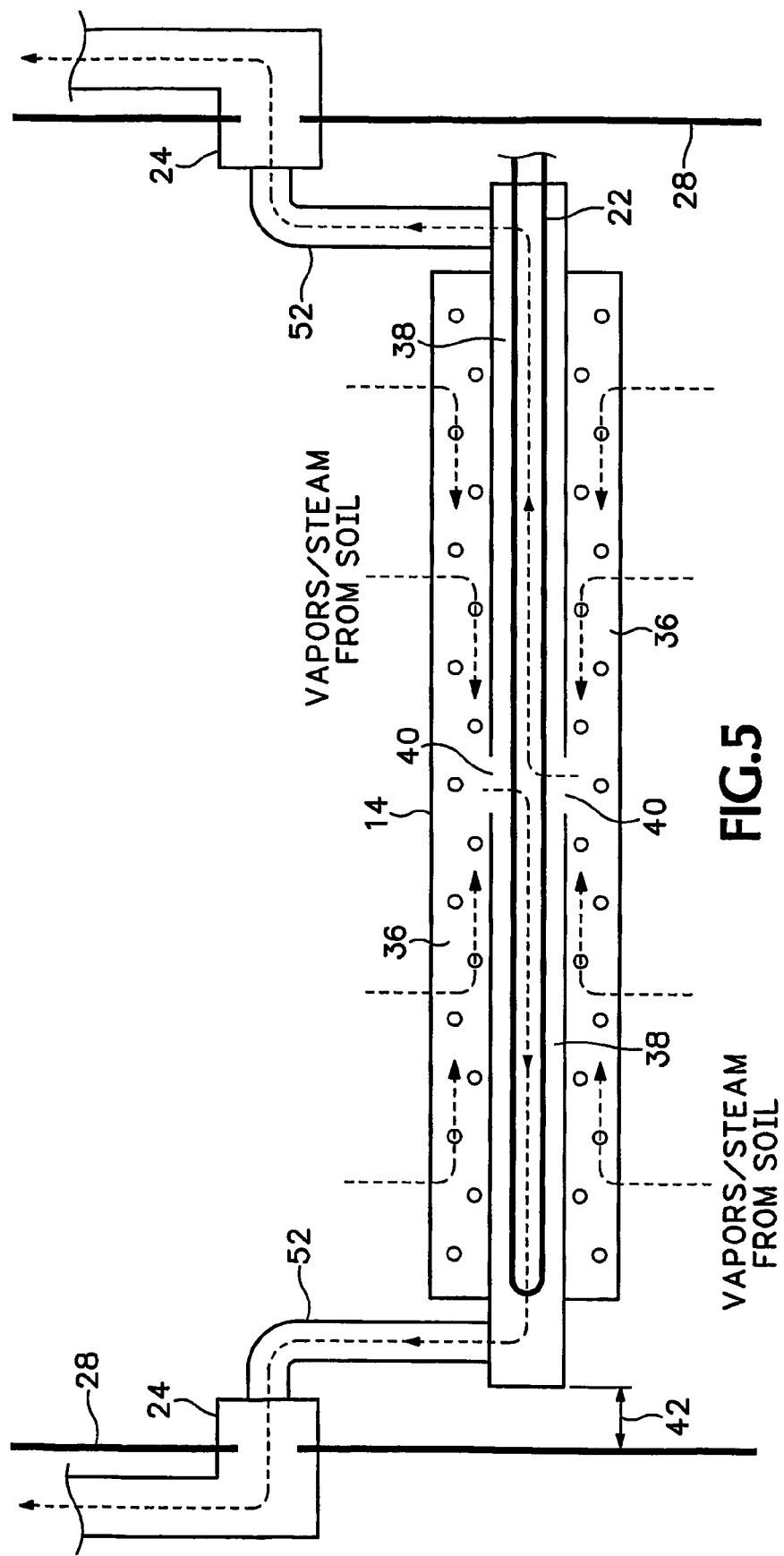
FIG. 5 is an enlarged, sectional schematic view of a multi-functional conduit of the present invention.

Referring now to FIGS. 3 and 4, the system 1a of the present invention can comprise of a multi-layer soil remediation cell formed of a plurality of adjacent layers of contaminated soil 12a-12e, having a plurality of multi-functional conduits 14a-14d located between the adjacent layers of contaminated soil, all housed within a bolt-together transportable container 28, which is typically fabricated of a metal such as structural steel. This system 1a is structurally and functionally similar to the above-described system 1 except when the contaminated soil treatment is complete, the container 28 is lifted and the soil contained therein is able to flow out the open bottom of the structural enclosure. Internal support members 44 is employed to maintain the structural integrity of the container 28 as it is being lifted. These containers 28 can be stacked atop each other for operation or transport.

The invention claimed is:

1. A system for remediation of contaminated soil, comprising:
    a soil remediation cell of contaminated soil; and
    a plurality of multi-functional conduits having a perforated portion comprising a plurality of perforations and a non-perforated portion located within said contaminated soil, each said multi-functional conduit defining a reaction housing,
    said multi-functional conduits including (a) heating elements for introducing heat into the contaminated soil for volatilizing the contaminants located within the contaminated soil, without utilizing mechanically driven forced air and further wherein the system does not utilize a vacuum to encourage contaminants to achieve a contaminated vapor, (b) flow channels having a plurality of perforations extend therethrough for removing said contaminated vapor from within said soil remediation cell, (c) said reaction housing wherein a substantial portion of the contaminants in said contaminated vapor are destroyed so as to produce a substantially non-contaminated vapor in which at least about 80% by weight of said contaminants have been destroyed; and; (d) said multi-functional conduits having conduit supports that function as a vapor path for the multi-functional conduits to an exhaust manifold.

2. The system of claim 1, wherein each said multi-functional conduit has a perforated portion comprising a plurality of perforations and a non-perforated portion, respectively.

3. The system of claim 2, wherein said non-perforated portion defines said reaction housing.

4. The system of claim 1, wherein the non-contaminate vapor does not include substantially any nitrogen oxides.

5. The system of claim 1, wherein the non-contaminate vapor is capable of being introduced directly into the atmosphere surrounding said soil remediation cell.

6. The system of claim 1, which does not include any additional recovery equipment to destroy said contaminants.

7. The system of claim 1, which does not include incineration of said substantially non-contaminated vapor.

8. The system of claim 1, wherein the non-contaminate vapor does not include more than about 0.01% of nitrogen oxides.

9. The system of claim 1, wherein at least about 85% by weight of said contaminants have been destroyed.

10. The system of claim 1, wherein at least about 90% by weight of said contaminants have been destroyed.

11. The system of claim 1, wherein at least about 95% by weight of said contaminants have been destroyed.

12. The system of claim 2, wherein the contaminated vapors flow into and through the perforated portion and into the non-perforated portion.

13. The system of claim 2, wherein said perforated portion is joined to the outer surface of said non-perforated portion, an opening being defined between the perforated portion and the non-perforated portion to facilitate the flow of said contaminated vapors from said perforated portion to said non-perforated portion.

14. The system of claim 13, wherein said opening is in the center portion of said multi-functional conduits.

15. The system of claim 2 wherein the contaminated vapors moves into and through the perforated portion and into the non-perforated portion, due to a pressure differential created by the heat introduced into, and generated within, the contaminated soil.

16. The system of claim 2, wherein said perforated portion 25 comprises a perforated tube and said non-perforated portion comprises a non-perforated tube.

17. The system of claim 1, wherein said multi-functions conduits comprise an expansion portion located adjacent to one end thereof.

18. The system of claim 1, wherein the contaminated soil is heated to an average temperature greater than about 212 degrees F.

19. The system of claim 1, wherein the contaminated soil, after removing said contaminated vapor from within said remediation cell, has an 5 average moisture level of not more than about 5% by weight.

20. The system of claim 1, wherein the amount of contaminated vapor that flows from the multi-functional conduits into the reaction housing is controlled by the amount of said heat introduced into said contaminated soil.

21. The system of claim 1, wherein said heat is produced by an electrical current.

22. The system of claim 1, wherein the contaminated vapor is destroyed within the confines of said remediation cell.

23. The system of claim 1, wherein said contaminated vapors are not recirculated to said soil remediation cell.

24. The system of claim 1, which has a sound level and a dust level in the area of the remediation cell which are substantially reduced due the absence of substantial equipment in the system having moving mechanical parts.

25. The system of claim 1, wherein a substantial constant level of soil remediation is maintained in the system due to either a substantially fixed heat introduction rate or a substantially fixed heat temperature.

26. The system of claim 1, wherein said remediation cell is multi-layered and formed of a plurality of adjacent layers of contaminated soil, and a plurality of multi-functional conduits are located between the adjacent layers of contaminated soil.

27. The system of claim 1, wherein multi-functional conduits are arranged in a substantially horizontal plane with respect to the horizontal axis of said remediation cell.

28. The system of claim 1, which further includes a high temperature covering.

29. The system of claim 1, wherein said remediation cell soil and said plurality of multi-functional conduits are located within a structural 5 enclosure.

30. The system of claim 29, wherein said structural enclosure defines an open bottom to facilitate removal of the non-contaminated soil.

31. The system of claim 30, wherein said structural enclosure includes support members for maintaining the integrity of the structural 10 enclosure during soil removal.

32. The system of claim 29, wherein said structural enclosure comprises a trailer.

33. The system of claim 30, wherein said multi-functional conduits are connected to said structural enclosure.

34. The system of claim 1, wherein a vapor space is provided above said soil remediation cell.

35. The system of claim 34, wherein said vapor space comprises a steam vapor space which, during remediation of said contaminated soil, provides a path for the vapors in this space to migrate into the multi-function conduits.

36. The system of claim 35, wherein a substantial amount of the contaminated vapors are destroyed within the soil prior to entering the multi-functional conduits.

37. The system of claim 30, wherein said structural enclosure is insulated.

38. The system of claim 30, wherein said structural enclosure is stackable onto another structural enclosure.

39. A method for remediating contaminated soil, comprising:
    forming a soil remediation cell of contaminated soil, and a plurality of multi-functional conduits located within said contaminated soil, each said multi-functional conduit defining a reaction housing;
    introducing substantial heat from said multi-functional conduits into the contaminated soil and volatilizing the contaminants located within the contaminated soil, without utilizing mechanically driven forced air such as a vacuum, thereby producing a contaminated vapor whereby the differential pressure between the vaporized contaminants and the pressure in the multi-functional conduit cause the vaporized contaminants to move into the multi-functional conduit;

removing said contaminated vapor from within said contaminated soil through flow channels within said multi-functional conduits;

introducing said contaminated vapor into said reaction housing; and destroying a substantial portion of the contaminants in said contaminated vapor within the reaction housing by utilizing high temperature heating elements so as to produce a substantially non-contaminated vapor in which at least about 80% by weight of said contaminants have been destroyed.

40. The method of claim 39, wherein each said multi-functional conduit has a perforated portion comprising a plurality of perforations forming flow channels for removing said contaminated vapor, and a non-perforated portion defining said reaction housing.

* * * * *